US010634837B2

(12) United States Patent
Liu et al.

(10) Patent No.: US 10,634,837 B2
(45) Date of Patent: Apr. 28, 2020

(54) LIGHTGUIDE WITH VARIOUS SHAPES AND EXTRACTING STRUCTURES

(71) Applicant: 3M INNOVATIVE PROPERTIES COMPANY, St. Paul, MN (US)

(72) Inventors: Tao Liu, Woodbury, MN (US); Brent A. Hedding, Hudson, WI (US); David C. Mercord, Prescott, WI (US); Brian W. Ostlie, Hudson, WI (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 142 days.

(21) Appl. No.: 15/569,572

(22) PCT Filed: Apr. 28, 2016

(86) PCT No.: PCT/US2016/029674
§ 371 (c)(1),
(2) Date: Oct. 26, 2017

(87) PCT Pub. No.: WO2016/182745
PCT Pub. Date: Nov. 17, 2016

(65) Prior Publication Data
US 2018/0313993 A1    Nov. 1, 2018

Related U.S. Application Data

(60) Provisional application No. 62/158,633, filed on May 8, 2015.

(51) Int. Cl.
*F21V 8/00* (2006.01)
*G02B 6/00* (2006.01)

(52) U.S. Cl.
CPC .............. *G02B 6/001* (2013.01); *G02B 6/00* (2013.01); *G02B 6/0038* (2013.01); *G02B 6/0065* (2013.01); *G02B 6/0035* (2013.01)

(58) Field of Classification Search
CPC .. G02B 6/00; G02B 6/001; G02B 6/35; G02B 6/36; G02B 6/38; G02F 1/133504; F21S 43/237
(Continued)

(56) References Cited

U.S. PATENT DOCUMENTS 5,432,876 A * 7/1995 Appeldorn ............. G02B 6/001
362/554
5,659,643 A * 8/1997 Appeldorn ............. G02B 6/001
362/551
(Continued)

FOREIGN PATENT DOCUMENTS

FR      2948173       1/2011
WO   WO 2014-189822  11/2014

OTHER PUBLICATIONS

International Search Report for PCT International Application No. PCT/US2016/029674, dated Jul. 28, 2016, 5 pages.

*Primary Examiner* — Anh T Mai
*Assistant Examiner* — Michael Chiang
(74) *Attorney, Agent, or Firm* — Jonathan L. Tolstedt

(57) ABSTRACT

Lightguides that include a plurality of discrete spaced apart light extracting structures are described. Each light extracting structure includes opposing inclined first and second sidewalls extending from a first side of the lightguide toward an optical axis of the light guide and meeting at an elongated peak extending along a first direction substantially perpendicular to the optical axis, and may include opposing first and second endwalls extending between the first and second sidewalls from the first side of the lightguide to the elongated peak to form a notch extending into a core of the lightguide. The first and second sidewalls are adapted to extract light propagating along the lightguide from an opposite second side of the lightguide by reflecting the propa- (Continued)

gating light toward the second side. The notch may have raised edges along at least a portion of a perimeter of the notch.

31 Claims, 8 Drawing Sheets

(58) Field of Classification Search
USPC .......................................................... 362/555
See application file for complete search history.

(56) References Cited

U.S. PATENT DOCUMENTS

| | | | | |
|---|---|---|---|---|
| 5,845,038 | A * | 12/1998 | Lundin | G02B 6/001 362/551 |
| 7,695,179 | B2 * | 4/2010 | Eichelberger | F21S 48/215 362/23.13 |
| 8,070,341 | B2 * | 12/2011 | Chinniah | G02B 6/001 362/23.16 |
| 8,322,905 | B2 * | 12/2012 | Parker | F21V 5/00 362/23.09 |
| 2008/0310187 | A1 * | 12/2008 | Huang | G02B 6/0008 362/615 |
| 2009/0201696 | A1 * | 8/2009 | Kamikatano | G02B 6/001 362/551 |
| 2011/0116286 | A1 * | 5/2011 | Rudek | G02B 6/001 362/615 |
| 2012/0063158 | A1 | 3/2012 | Frankiewicz | |
| 2014/0140091 | A1 | 5/2014 | Vasylyev | |

* cited by examiner

LIGHTGUIDE WITH VARIOUS SHAPES AND EXTRACTING STRUCTURES

BACKGROUND

Optical fibers may be used to provide illumination in various applications such as strip and panel lighting. An optical fiber may include a plurality of notches defining reflecting surfaces such that light striking the reflecting surfaces is reflected out of the fiber.

SUMMARY

In some aspects of the present description, a lightguide centered on an optical axis and comprising a plurality of discrete spaced apart laser-ablated light extracting structures is provided. Each light extracting structure includes opposing inclined first and second sidewalls extending from a first side of the lightguide toward the optical axis and meeting at an elongated peak extending along a first direction substantially perpendicular to the optical axis. The first and second sidewalls are adapted to extract light propagating along the lightguide from an opposite second side of the lightguide by reflecting the propagating light toward the second side. Each light extracting structure also includes opposing generally triangular-shaped first and second endwalls extending between the first and second sidewalls from the first side of the lightguide to the elongated peak to form a notch extending into a core of the lightguide. The notch has raised edges at least along the first and second endwalls.

In some aspects of the present description, a lightguide is provided that is centered on an optical axis and that includes a plurality of discrete spaced apart laser-ablated light extracting structures adapted to extract light propagating along the lightguide from an exit side of the lightguide by reflecting the propagating light toward the exit side. In plan view, each light extracting structure has a plurality of sides including opposing longer sides extending along a first direction substantially perpendicular to the optical axis and opposing shorter sides substantially parallel to the optical axis. The light extracting structures has raised edges along at least some of the plurality of sides.

In some aspects of the present description, a lightguide centered on an optical axis and comprising a plurality of discrete spaced apart laser-ablated light extracting structures is provided. Each light extracting structure defines a cavity extending from a first side of the lightguide into a core of the lightguide. The cavity is elongated along a first direction substantially perpendicular to the optical axis, such that a maximum depth of the cavity does not decrease when moving along at least a portion of a length of the cavity along the first direction between a middle of the cavity and an edge of the cavity. Each cavity defines a closed perimeter at the first side of the lightguide. The cavity has a raised edge along at least a portion of the closed perimeter.

In some aspects of the present description, an elongated lightguide is provided. The lightguide is extended along a length of the lightguide and comprises a plurality of discrete spaced apart light extracting structures disposed on a planar top portion of the lightguide and extracting, from an opposite curved bottom portion of the lightguide, light that would otherwise be confined and propagate within the lightguide along the length of the lightguide primarily by total internal reflection. Each light extracting structure defines a cavity extending from the planar top portion of the lightguide into a core of the lightguide.

In some aspects of the present description, a lightguide centered on an optical axis and comprising a plurality of discrete spaced apart light extracting structures is provided. Each light extracting structure includes opposing inclined first and second sidewalls extending from a first side of the lightguide toward the optical axis and meeting at an elongated peak extending along a first direction substantially perpendicular to the optical axis. The first and second sidewalls are adapted to extract light propagating along the lightguide from an opposite second side of the lightguide by reflecting the propagating light toward the second side. Each light extracting structure further includes opposing first and second endwalls extending between the first and second sidewalls from the first side of the lightguide to the elongated peak to form a notch extending into a core of the lightguide. The first and second endwalls are generally half-hemispherically shaped and in plan view, each light extracting structure has a substantially obround shape having curved sides bounding the first and second endwalls and straight sides bounding the first and second sidewalls.

In some aspects of the present description, an elongated lightguide is provided. The lightguide is extended along a length of the lightguide and comprises a plurality of discrete spaced apart light extracting structures disposed on a planar top portion of the lightguide and extracting, from an opposite curved bottom portion of the lightguide, light that would otherwise be confined and propagate within the lightguide along the length of the lightguide primarily by total internal reflection. Each light extracting structure defines a notch extending from the planar top portion of the lightguide into a core of the lightguide. The elongated lightguide further includes opposing curved side portions extending away and downwardly from opposite sides of the planar top portion toward the curved bottom portion. The planar top portion forms a plateau raised relative to upper edges of the opposing curved side portions.

DETAILED DESCRIPTION

Figure 1A:
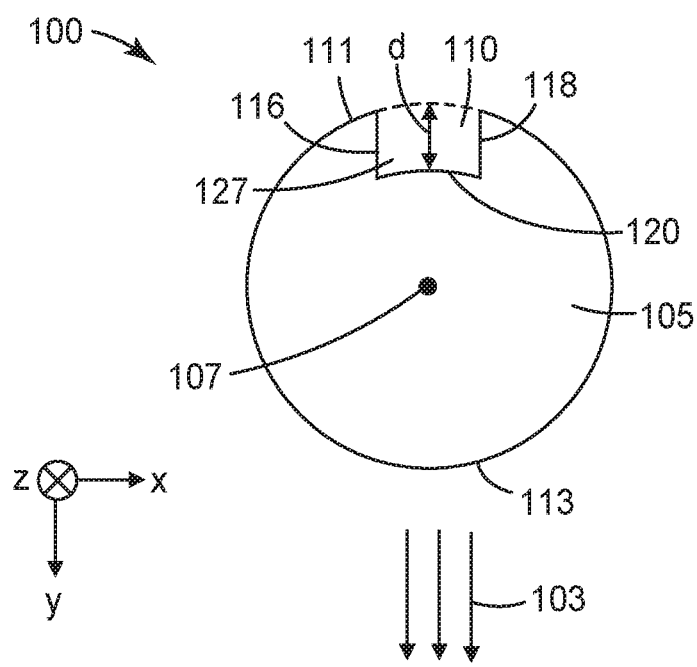
FIG. 1A is a schematic cross-sectional view of a lightguide.

In the following description, reference is made to the accompanying drawings that forms a part hereof and in which are shown by way of illustration. The drawings are not necessarily to scale. It is to be understood that other embodiments are contemplated and may be made without departing from the scope or spirit of the present disclosure. The following detailed description, therefore, is not to be taken in a limiting sense.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

Elongated lightguides having light extracting structures may be used to provide a light output which may be directed towards a target plane, for example. A wider light distribution on the target plane than that readily achievable in current lightguides is desired for some applications. According to the present description, geometries of light extracting structures and lightguides incorporating the light extracting structures have been discovered that provide improved light output distributions and/or provide desired light output distributions that are less sensitive to orientation or rotation of the lightguide compared to conventional lightguides. The improved geometric features may include one or more of a cavity depth that does not continuously decrease from a center of the cavity to an edge of the cavity, a cavity having a curved elongated peak, a cavity with opposing sidewalls and opposing endwalls, and a lightguide with light extracting structures in a planar top portion of a curved or partially curved light guide.

Lightguides described herein may include a core and may optionally include a cladding surrounding the core. Light propagating through a lightguide may be confined to the lightguide through total internal reflections at an outer surface of the core of the lightguide. A cladding layer may optionally be used to improve total internal reflection at the outer surface of the core of the lightguide when the lightguide contacts another object. Alternatively, an air interface may be present at an outer surface of the core. Light extracting structures, which may extend into the core of the lightguide, can be included to extract light from the lightguide in a desired direction.

The lightguides or the core of the lightguides of the present description may be made from an optically clear polymeric material or a glass, for example. Suitable polymeric materials include acrylates such as polymethyl methacrylate (PMMA), polycarbonate, and polyurethane, for example. Lightguides having light extracting features can be made by injection molding, for example. Alternatively, the lightguides can be made by first forming the lightguides without light extracting features and then creating the light extracting features through a subsequent processing step. The lightguides can be formed without light extracting structures, by extrusion or by molding, for example. The light extracting structures can then be formed by etching, laser ablation, or embossing, for example. A cladding layer may optionally be added to the lightguide either before or after the light extracting structures are formed. The cladding material may be any material having a lower refractive index than the core of the lightguide. Suitable materials for the cladding layer include fluoropolymers, for example. In some embodiments, no cladding layer is added.

Figure 1B:
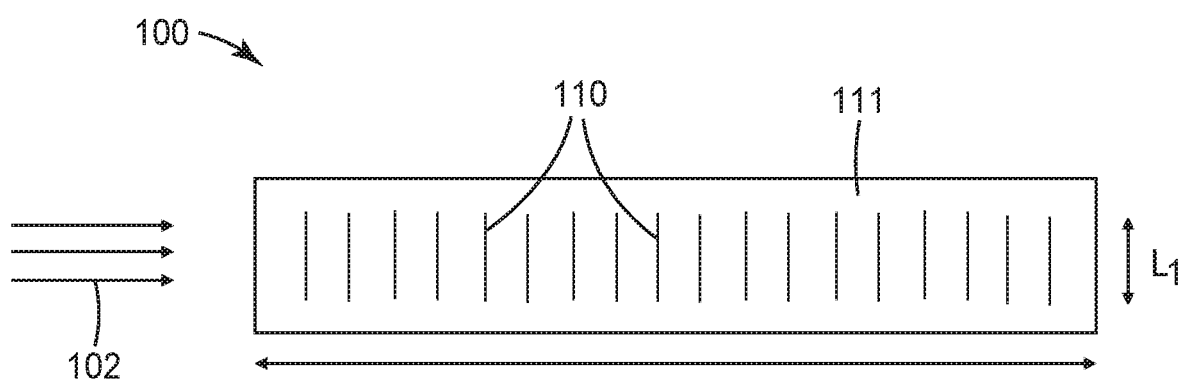
FIG. 1B is a schematic plan view of the lightguide of FIG. 1A.

FIGS. 1A-1B are schematic cross-sectional and plan views of lightguide 100 having a core 105 and including a plurality of discrete, spaced apart light extracting structures 110 on a first side 111 of the lightguide 100. A Cartesian x-y-z coordinate system is shown in FIGS. 1A-1B. Lightguide 100 has an optical axis 107 that is parallel to the z-axis. Lightguide 100 is configured such a light 102 injected into an end of the lightguide 100 can propagate along the lightguide 100 in the z-direction. The light extracting structures 110 extract light that is propagating along the lightguide 100 as extracted light 103 from a second side 113 of the lightguide 100 opposite the first side 111 by reflecting the propagating light toward the second side 113. The second side 113 is an exit side of the lightguide 100. Each light extracting structure 110 defines a notch or cavity 127 extending from the first side 111 into the core 105. Cavity 127 has first and second edges 116 and 118. Each light extracting structure 110 has an elongated peak 120 extending along a first direction (the x-direction) substantially perpendicular to the optical axis 107 of the lightguide 100. Each light extracting structure 110 forms a notch extending into the core 105 of the lightguide 100 and the elongated peak 120 is a peak of the notch into the core 105. Light extracting structures 110 are schematically shown as lines in FIG. 1B, but would typically have some extent in the z-direction as described elsewhere herein (see, e.g., FIG. 2A).

The light extracting structures 110 may have a depth d that does not decrease when moving along a least a portion of a length of the cavity 127 along the first direction (x-direction) between a middle of the cavity 127 and an edge (first edge 116 or second edge 118) of the cavity 127. In some embodiments, each light extracting structure 110 has a substantially constant maximum depth along at least 40% (or at least 50%, or at least 60%, or at least 70%, or at least 80%, or at least 90%) of a length $L_1$ of the cavity 127 along the first direction. In some embodiments, the first side 111 has the shape of a substantially cylindrical surface and the elongated peak 120 is substantially an arc that is substantially parallel to the cylindrical surface. In such embodiments, each light extracting structure 110 may have a substantially constant maximum depth along substantially all of the length $L_1$ of the cavity along the first direction. Lightguide 100 is extended along a length $L_2$ of the lightguide 100. The light extracting structures 110 may be included throughout substantially all of the length $L_2$ or may be included only over a portion of the length $L_2$. The distribution of the light extracting structures 110 may be chosen based on the desired lighting application. In some embodiments, the maximum depth of the cavity 127 may be greater than 10 micrometers, or greater than 50 micrometers, or greater than 100 micrometers and may be less than 500 micrometers, or less than 300 micrometers, or less than 200 micrometers.

Figure 2A:
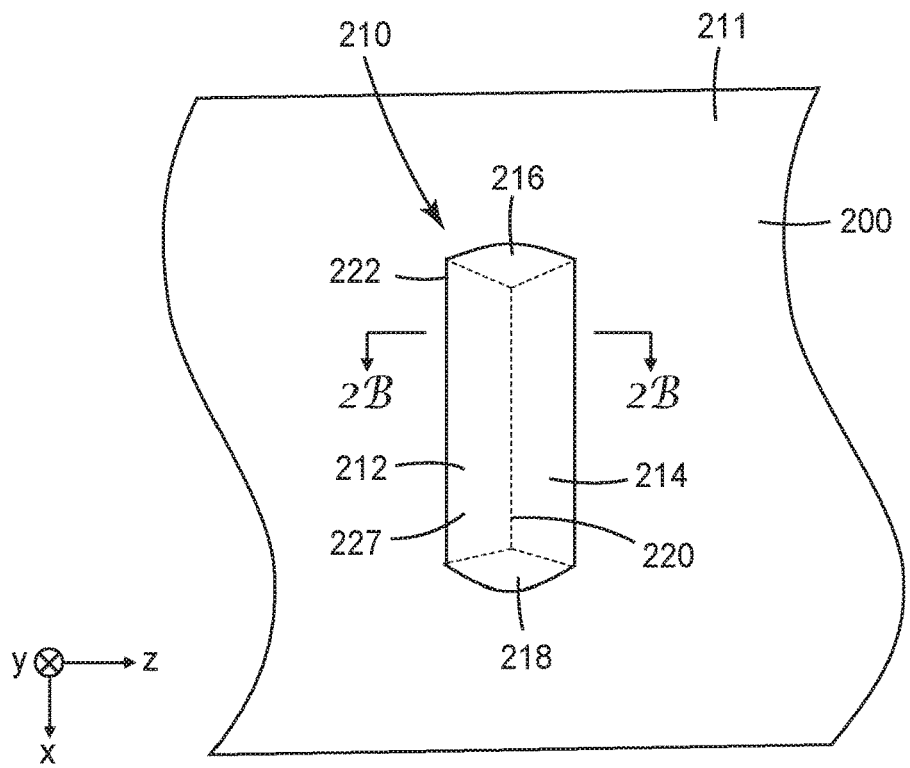
FIG. 2A is a plan view of a light extracting structure.
Figure 2B:
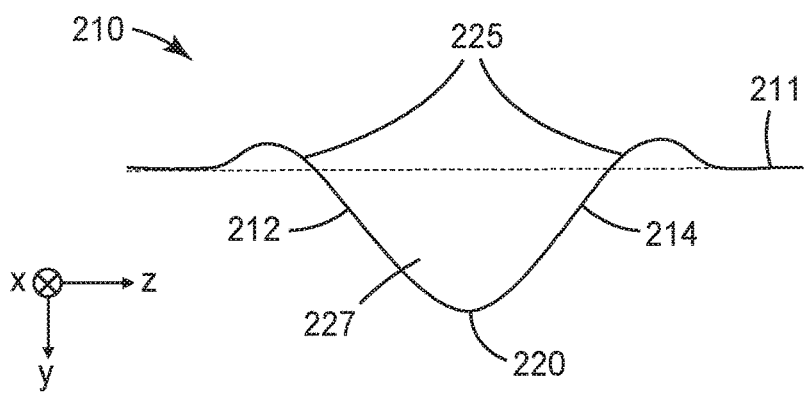
FIG. 2B is a cross-sectional view of a light extracting structure.

FIGS. 2A-2B show plan and cross-sectional views respectively of light extracting structure 210, which may correspond to any of the light extracting structures 110 of FIGS. 1A-1B. Light extracting structure 210 includes opposing inclined first and second sidewalls 212 and 214 extending from a first side 211 of a lightguide 200 toward the optical axis of the lightguide 200 and meeting at an elongated peak 220 extending along a first direction (x-direction) substantially perpendicular to the optical axis (which is parallel to z-direction). The first and second sidewalls 212 and 214 are adapted to extract light propagating along the lightguide 200 from an opposite second side (corresponding to second side 113) of the lightguide 200 by reflecting the propagating light toward the second side. Light extracting structure 210 also includes opposing generally triangular-shaped first and second endwalls 216 and 218 extending between the first and second sidewalls 212 and 214 from the first side 211 of the lightguide 200 to the elongated peak 220 to form a cavity or notch 227 extending into a core of the lightguide.

The notch 227 has raised edges 225 along at least a portion of the closed perimeter 222 of the light extracting structure 210. For example, the notch 227 may have raised edges at least along the first and second endwalls 216 and 218 and/or the notch 227 may have raised edges 225 at least along the first and second sidewall 212 and 214 as illustrated in FIG. 2B. In some embodiments, each cavity or notch 227 has a raised edge along at least 50% (or at least 60%, or at least 70%) of the closed perimeter 222. The raised edges 225 may be formed when the light extracting structure 210 is formed by designing a mold used to injection mold the lightguide 200 to include these features. Alternatively, light extracting structure 210 may be made by embossing or laser ablation and the raised edges 225 may be formed during the embossing or laser ablation process. Any of the light extracting structures described herein may be laser-ablated light extraction structures and may include raised edges along at least a portion of a perimeter of the light extracting structure. The raised edges may include material from the core of the lightguide.

Figure 2C:
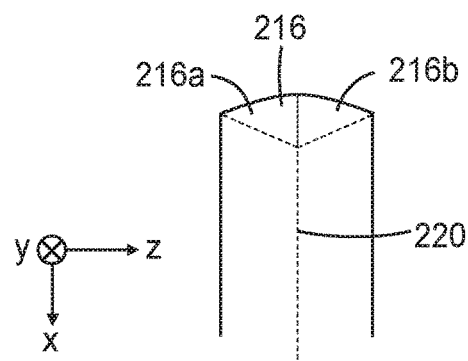
FIG. 2C is a plan view of a portion of a light extracting structure.

Sidewalls 212 and 214 and endwalls 216 and 218 are collectively a plurality of sides of the light extracting structure 210. The plurality of sides include longer sides (sidewalls 212 and 214) extending along a first direction (the x-direction) substantially perpendicular to the optical axis (which is parallel to the z-direction). The plurality of sides also include shorter sides (endwalls 216 and 218) which are substantially parallel to the optical axis. In some embodiments, in plan view, the elongated peak 220 extends substantially parallel to the opposing longer sides (first and second sidewalls 212 and 214) and bisects each shorter side (endwalls 216 and 218) into two substantially equal portions. This is shown in FIG. 2C where, for illustration, the line representing elongated peak 220 has been extended through endwall 216. Elongated peak 220 bisects endwall 216 into two substantially equal portions 216a and 216b, which, for example, may have substantially equal surface areas which may each be substantially one half of the surface area of endwall 216.

In some embodiments, in a cross-section of the light extracting structure in a direction perpendicular to the optical axis (e.g., the cross-section in the x-y plane of FIG. 1A), the extended peak has a first curvature (e.g., the curvature of the elongated peak 120 in the x-y plane), and in a cross-section of the structure in a direction parallel to the optical axis (e.g., the cross-section in the y-z plane of FIG. 2B), the extended peak has a second curvature (e.g., the curvature of the elongated peak 220 in the y-z plane). The absolute value of the second curvature may be greater than the absolute value of the first curvature. In some embodiments, the elongated peak is curved and has a radius of curvature (e.g., the reciprocal of the absolute value of the first curvature) in a cross-section of the light extracting structure in a direction perpendicular to the optical axis (e.g., the cross-section in the x-y plane of FIG. 1A). The radius of curvature may be less than a largest lateral dimension of the cross-section along at least 50%, or at least 70%, or at least 90% of an arc length of the elongated peak. In the case of a substantially cylindrical lightguide, the largest lateral dimension of the cross-section in a plane perpendicular to the optical axis of the lightguide is the diameter of the light guide. In other embodiments, the cross-section of the lightguide may be a square or rectangle and the largest lateral dimension of the square or rectangle is the length of the diagonal of the square or rectangle. In some embodiments, the radius of curvature is less than or about equal to half of a largest lateral dimension of the cross-section along at least 50%, or at least 70%, or at least 90% of an arc length of the elongated peak. In some embodiments, the largest lateral dimension of a cross-section of a lightguide perpendicular to an optical axis of the light guide is in a range of 1 mm, or 2 mm, or 3 mm to 15 mm, or 20 mm, or 25 mm.

Another quantity which may be useful in describing the shape of the light extracting structures is the Gaussian curvature along the extended peak. Gaussian curvature refers to the product of the two principle curvatures of a surface. The principle curvatures at a point on a surface are the minimum and maximum values of the curvature of the surface in planes containing a vector normal to the surface at the point. A sign may be associated with a principle curvature depending on whether the surface is turning towards (positive) or away (negative) from an outwardly (towards the outside of the lightguide) pointing normal vector to the surface in the plane where the curvature has a maximum or minimum value. A saddle-shaped surface has a negative Gaussian curvature. In some embodiments, the light extracting structures are generally saddle-shaped. In some embodiments, the light extracting structures have a first principle curvature in a direction perpendicular to the optical axis (e.g., in a cross-section in the x-y plane) and a second principle curvature in a direction parallel to the optical axis (e.g., in a cross-section in the y-z plane). In some embodiments, the second principle curvature has an absolute value larger than an absolute value of the first principle curvature, and the first and second principle curvatures have opposite signs. In some embodiments, the elongated peaks of the present description have a negative Gaussian curvature along at least a portion of the elongated peak. For example, the principle curvature of an elongated peak in a plane containing the optical axis (the y-z plane) may be positive (see, e.g., elongated peak 220 in FIG. 2B) while the principle curvature of an elongated peak in a plane perpendicular to the optical axis (the x-y plane) may be negative (see, e.g., elongated peak 120 in FIG. 1A). The Gaussian curvature along the elongated peak may negative along at least 50%, or at least 70%, or at least 90% of an arc length of the elongated peak, for example.

Figure 12:
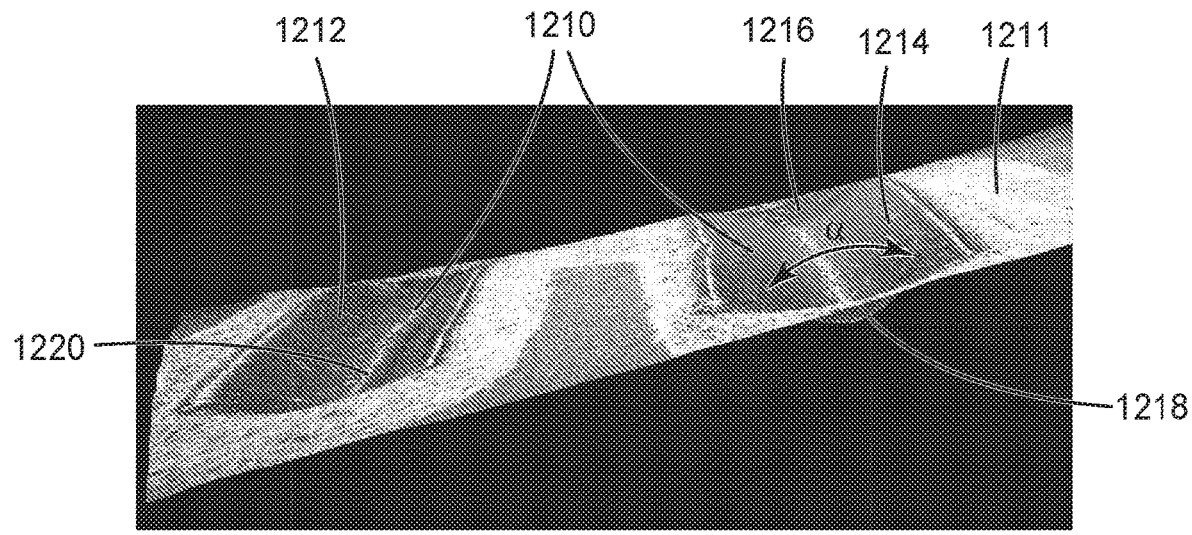
FIG. 12 is an image of a portion of a side of a lightguide.

FIG. 12 is an image of a first side 1211 of a lightguide including a plurality of light extracting structures 1210 extending from the first side 1211 into a core the lightguide. The image was formed by applying silver paste on the light extracting structures and surrounding areas of a lightguide to increase light scattering for use with a microscope. Each of the light extracting structures 1210 include a plurality of sides which include opposing longer sides 1212 and 1214 extending along a direction substantially perpendicular to the optical axis of the lightguide, and includes opposing shorter sides 1216 and 1218 substantially parallel to the optical axis. The longer sides 1212 and 1214 may be referred to as sidewalls and the shorter sides 1216 and 1218 may be referred to as endwalls. The opposing longer sides 1212 and 1214 of each light extracting structure meet at an elongated peak 1220. A length along the elongated peak 1220 between the opposing shorter sides 1216 is an arc length of the elongated peak 1220. In the illustrated embodiment, the elongated peak 1220 is curved in a cross-section of the light extracting structure in a plane perpendicular to the optical axis and has a negative Gaussian curvature along substantially the entire arc length of the elongated peak 1220. The light extracting structures 1210 may be described as generally saddle-shaped. An apex angle α between the longer sides 1212 and 1214 at the elongated peak 1220 may be in a range of 80 degrees to 150 degrees, for example.

Figure 3:
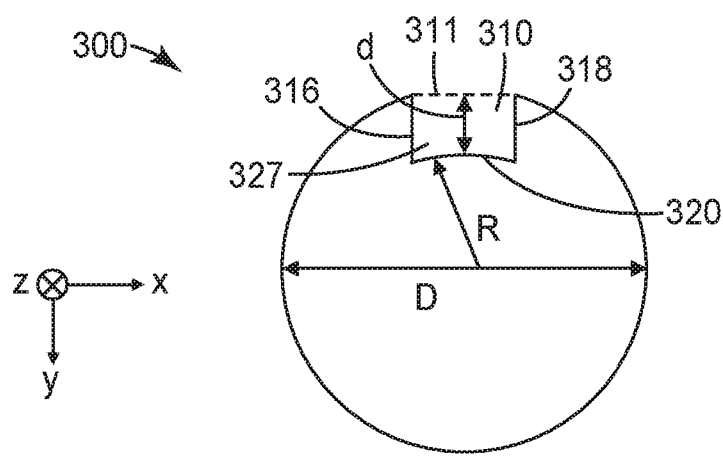
FIG. 3 is a cross-sectional view of a lightguide.

FIG. 3 shows a cross-sectional view of lightguide 300 including a plurality of light extracting structures 310 extending from a first side 311 of the lightguide 300. Each light extracting structure has an elongated peak 320 having a radius of curvature of R in a cross-section (x-y plane) perpendicular to the optical axis. Each light extracting structure 310 defines a cavity 327 and includes first and second sidewalls (corresponding to first and second sidewalls 212 and 214) and first and second ends 316 and 318. The lightguide 300 has a largest lateral dimension in the cross-section of D, the diameter of the lightguide. First side 311 is substantially flat. In some embodiments, the radius of curvature R is no more than about half of the largest lateral dimension D. The light extracting structures 310 have a depth d that does not decrease when moving along a least a portion of a length of the cavity 327 along the first direction (x-direction) between a middle of the cavity 327 and an edge (at first or second end 316 or 318) of the cavity 327. In some embodiments, the light extracting structures 310 and have a depth d that increases when moving along a least a portion of a length of the cavity 327 along the first direction between a middle of the cavity 327 and an edge (at first or second end 316 or 318) of the cavity 327. In some embodiments, first side 311 is substantially flat along the length of the lightguide 300. In other embodiments, the lightguide 300 includes a plurality of discrete spaced apart planar sections along the length of the lightguide 300 and each light extracting structure 310 is formed in a corresponding planar section. Such discrete spaced apart planar sections are further described elsewhere herein.

Figure 4A:
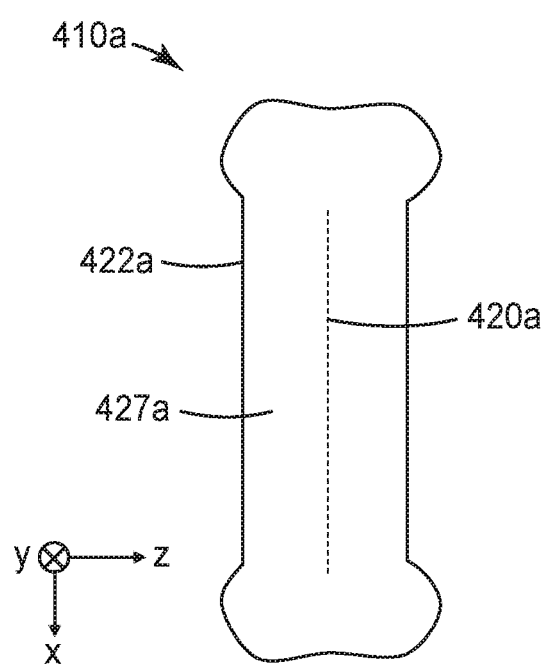
FIGS. 4A-4B are plan views of light extracting structures.
Figure 4B:
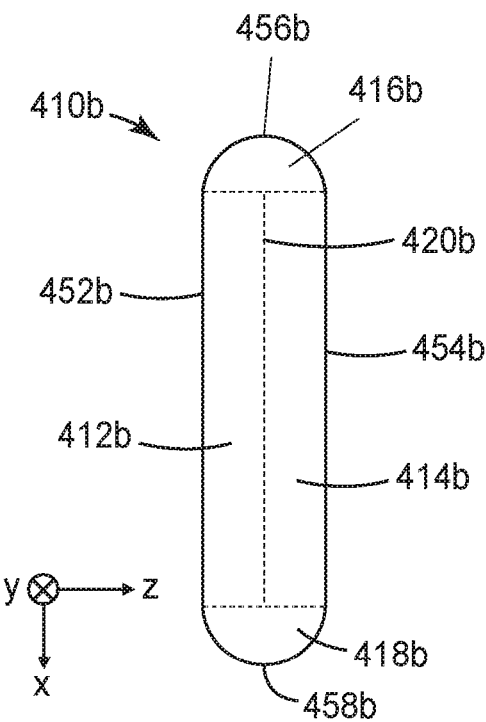

FIGS. 4A-4B are top plan views of light extracting structures of the present description. FIG. 4A is a plan view of light extracting structure 410a including a cavity 427a having a closed perimeter 422a and an elongated peak 420a. In plan view, cavity 427a generally has a dog bone shape. FIG. 4B is a plan view of light extracting structure 410b having a substantially obround shape having opposing longer straight sides 452b and 454b extending along a first direction (the x-direction) and opposing shorter curved sides 456b and 458b substantially parallel to the optical axis (the z-direction). Light extracting structure 410b includes opposing first and second sidewalls 412b and 414b meeting at elongated peak 420b, and includes opposing first and second endwalls 416b and 418b. Sides 452b and 454b bound first and second sidewalls 412b and 415b and sides 456b and 458b bound first and second endwalls 416b and 418b. First and second endwalls 416b and 418b may be substantially half-hemispherically shaped. In other words, each of first and second endwalls 416b and 418b may have a shape substantially that of a surface of half of a hemisphere.

Figure 13:
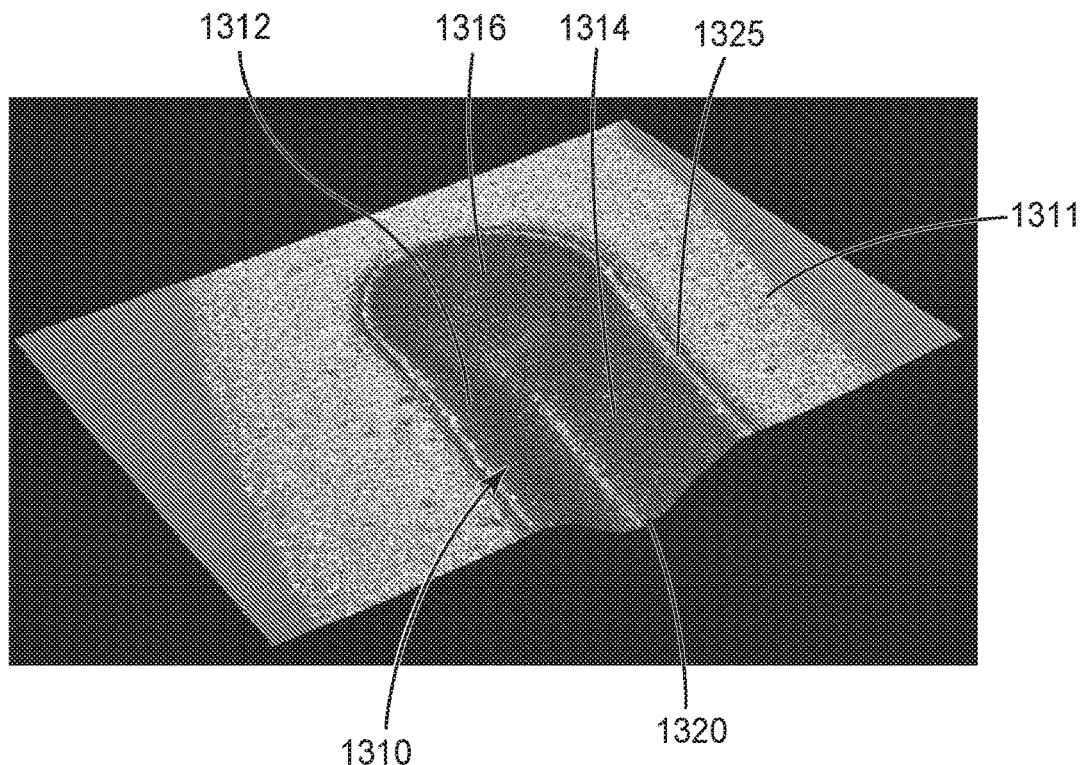
FIG. 13 is an image of a portion of a light extracting structure.

FIG. 13 is an image of a portion of a light extracting structure 1310 extending from a first side 1311 of a lightguide into a core the lightguide. Light extracting structure 1310, which may correspond to light extracting structure 410b, includes first and second sidewalls 1312 and 1314 meeting at elongated peak 1320. Light extracting structure 1310 includes endwall 1316 which is substantially half-hemispherically shaped. Light extracting structure 1310 may also include raised edges 1325 around a least a portion of the perimeter of the light extracting structure 1310. Light extracting structure 1310 can be made by laser ablation, for example.

Figure 5:
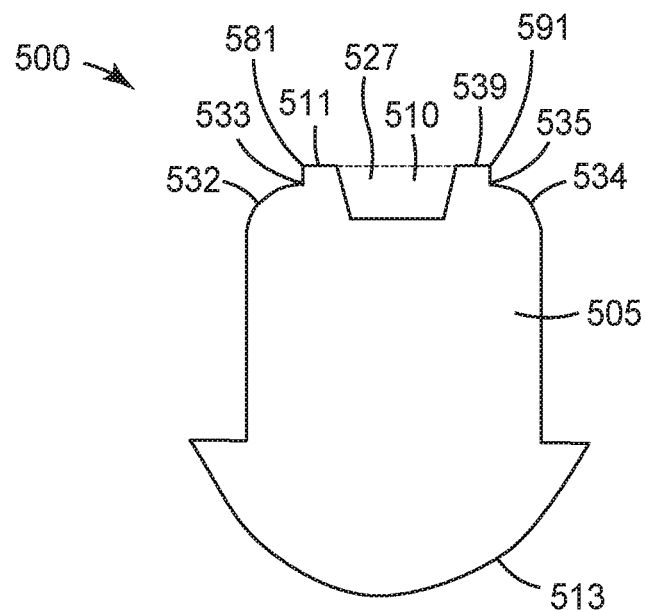
FIG. 5 is a side view of a lightguide.

FIG. 5 is a cross-sectional view of lightguide 500 which is elongated along a length of the lightguide in the z-direction (as in FIG. 1B). Lightguide 500 includes a plurality of discrete spaced apart light extracting structures 510 disposed on a planar top portion 511 of the lightguide 500 and extracting, from an opposite curved bottom portion 513 of the lightguide 500, light that would otherwise be confined and propagate within the lightguide 500 along the length of the lightguide 500 primarily by total internal reflection. Each light extracting structure 510 defines a notch or cavity 527 extending from the planar top portion 511 of the lightguide 500 into a core 505 of the lightguide 500. Lightguide 500 may have an improved light output distribution and/or may have a light output distribution that is less sensitive to orientation or rotation of the lightguide 500 compared to conventional lightguides.

Lightguide 500 includes opposing curved side portions 532 and 534 extending away and downwardly from opposite sides 581 and 591 of the planar top portion 511 toward the curved bottom portion 513. In the illustrated embodiment, the planar top portion 511 forms a plateau 539 raised relative to upper edges 533 and 535 of the opposing curved side portions 532 and 534, respectively. In some embodiments, the lightguide 500 has sharp corners at upper edges 533 and 535 having a zero or near-zero radius of curvature. In other embodiments, the lightguide 500 may have radiused corners at upper edges 533 and 535. In some embodiments, the planar top portion 511 may not be raised relative to upper edges 533 and 535. In such embodiments, there may be substantially no sharp corners between upper edges 533 and 535 and top portion 511.

In some embodiments, the cavity 527 defined by each light extracting structure 510 includes a first side surface (corresponding to one of sidewall 212 and sidewall 214) adapted to extract light propagating along the length of the lightguide from the curved bottom portion 513 of the lightguide by reflecting the propagating light toward the bottom portion 513. In some embodiments, the cavity 527 defined by each light extracting structure 510 further includes a second side surface (corresponding to the other of sidewall 212 and sidewall 214) opposing the first side surface.

Figure 14:
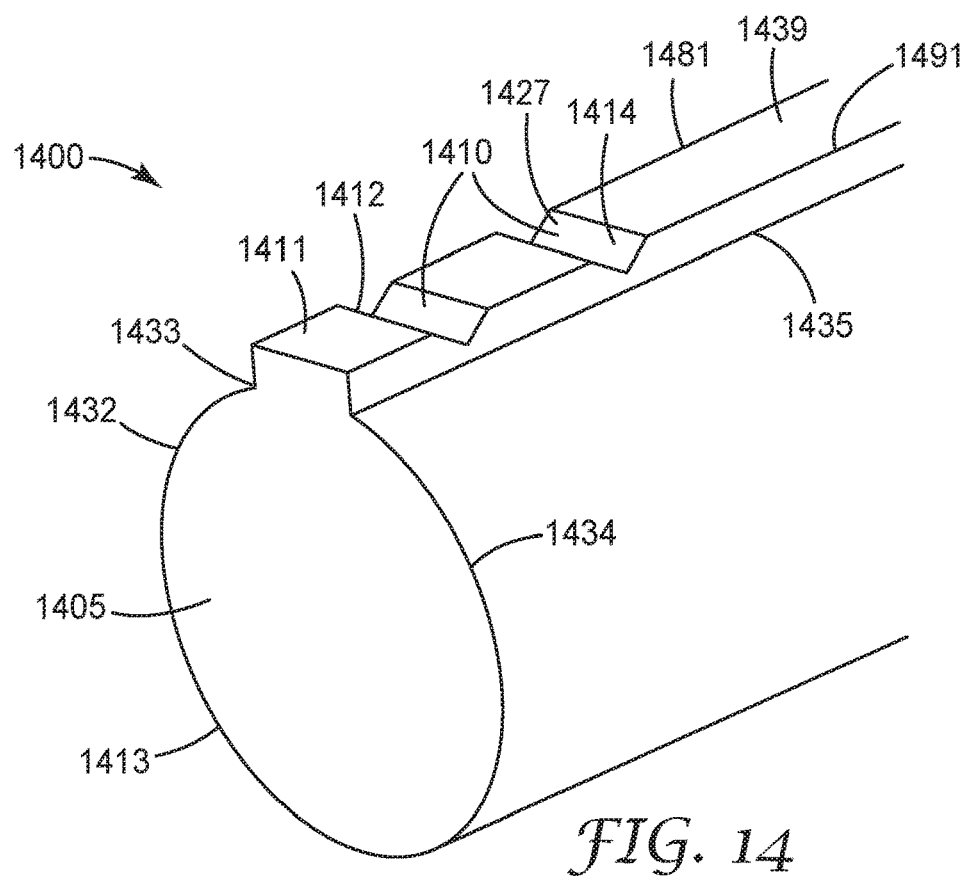
FIG. 14 is a perspective view of a lightguide.

Another embodiment is shown in FIG. 14, which is a cross-sectional view of lightguide 1400 which is elongated along a length of the lightguide. Lightguide 1400 includes a plurality of discrete spaced apart light extracting structures 1410 disposed on a planar top portion 1411 of the lightguide 1400 and extracting, from an opposite curved bottom portion 1413 of the lightguide 1400, light that would otherwise be confined and propagate within the lightguide 1400 along the length of the lightguide 1400 primarily by total internal reflection. Each light extracting structure 1410 defines a notch 1427 extending from the planar top portion 1411 of the lightguide 1400 into a core 1405 of the lightguide 1400. Lightguide 1400 may have an improved light output distribution and/or may have a light output distribution that is less sensitive to orientation or rotation of the lightguide 1400 compared to conventional lightguides.

Lightguide 1400 includes opposing curved side portions 1432 and 1434 extending away and downwardly from opposite sides 1481 and 1491 of the planar top portion 1411 toward the curved bottom portion 1413. The planar top portion 1411 forms a plateau 1439 raised relative to upper edges 1433 and 1435 of the opposing curved side portions 1432 and 1434. The width of the notch 1427 may be substantially equal to the width of the planar top portion 1411. In some embodiments, the lightguide 1400 has sharp corners at upper edges 1433 and 1435 having a zero or near-zero radius of curvature. In other embodiments, the lightguide 1400 may have radiused corners at upper edges 1433 and 1435. In the embodiment illustrated in FIG. 14, the notches 1427 extend into the core 1405 (e.g., extend through any cladding layer that may be present), but do not extend below the upper edges 1433 and 1435 of the opposing curved side portions 1432 and 1434. In other embodiments, the notches 1427 may extend below the upper edges 1433 and 1435. In some embodiments, the curved bottom portion 1413 and the opposing curved side portions 1432 and 1434 are substantially cylindrical surfaces. In some embodiments, the lightguide 1400 is substantially cylindrical.

In some embodiments, the notch 1427 defined by each light extracting structure 1410 includes a first side surface 1412 adapted to extract light propagating along the length of the lightguide from the curved bottom portion 1413 of the lightguide by reflecting the propagating light toward the curved bottom portion 1413. In some embodiments, the notch 1427 defined by each light extracting structure 1410 further includes a second side surface 1414 opposing the first side surface 1412.

Figure 6:
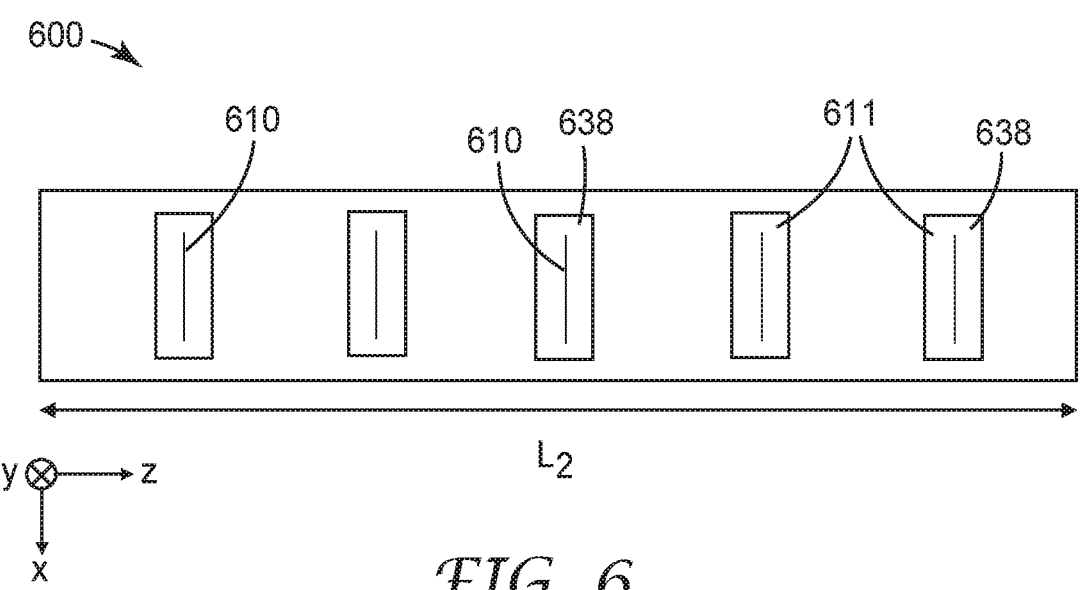
FIG. 6 is a plan view of a lightguide.

FIG. 6 is a schematic top plan view of lightguide 600 including a plurality of discrete spaced apart light extracting structures 610 and having a planar top portion 611 that includes a plurality of discrete spaced apart planar sections 638 along the length $L_2$ of the lightguide 600. Lightguide 600 may correspond to any of the lightguides described herein, such as, for example, lightguide 500. In some embodiments, the regions of the top surface of the lightguide 600 between the planar sections 638 may have a substantially cylindrical shape. In some embodiments, each light extracting structure 610 is formed in a corresponding planar section 638. In some embodiments, each planar section 638 includes only one light extracting structure 610 and in some embodiments, one or more planar sections 638 include a plurality of light extracting structures 610. Light extracting structures 610 are schematically shown as lines in FIG. 6, but would typically have some extent in the z-direction as in FIG. 2A, for example.

EXAMPLES

Example 1 and Comparative Example C-1

Figure 7:
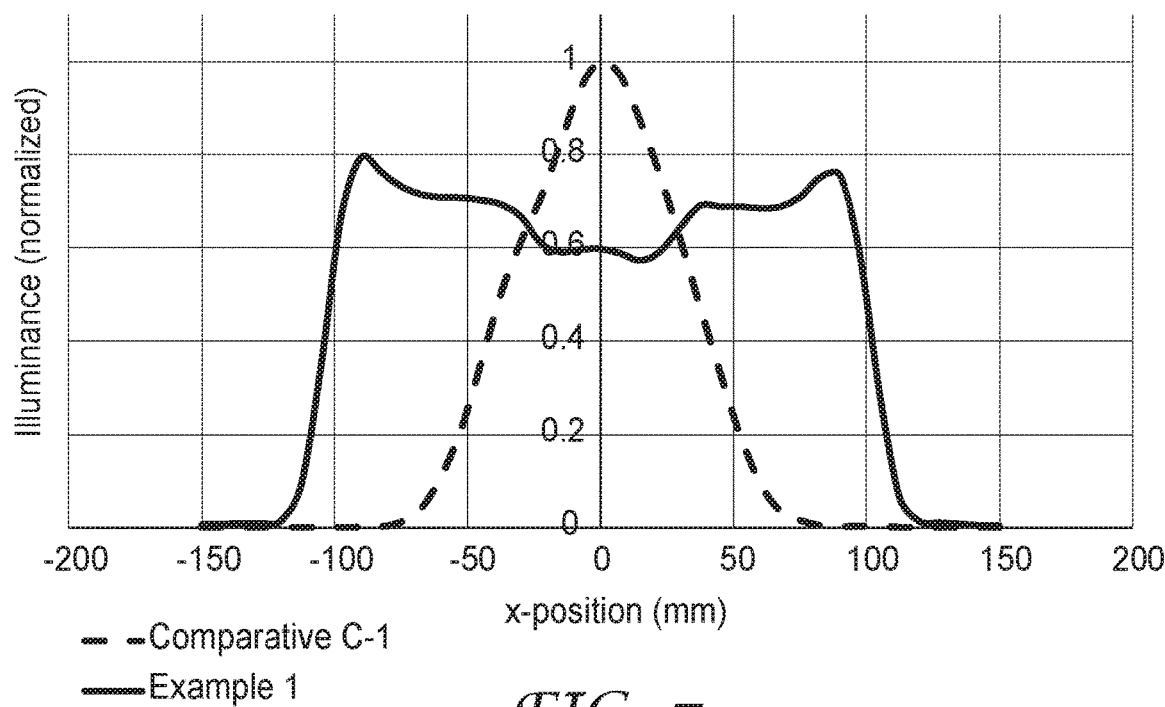
FIG. 7 is a graph of illuminance distributions of light output from lightguides.

Optical modeling was used to simulate the performance of the notch geometry of FIGS. 1A-1B (Example 1) versus conventional notches having a flat bottom (Comparative Example C-1). In the simulation, two light emitting diodes (LEDs), which were modeled as OSRAM CN5M LEDs, were attached to a 2000 mm long solid lightguide having a 7 mm diameter. The refractive index of the solid lightguide was 1.49. Notches as shown in FIGS. 1A-1B were defined into the round surface. The notches had an apex angle of 120 degrees between first and second sidewalls of the notch, had a center depth of 0.168 mm, and had a width of 2 mm (the length $L_1$ along the x-direction, referring to FIG. 1B). A comparative lightguide having similar overall geometry but using notches with a flat bottom having a depth continuously decreasing towards zero from a center of the notch to an edge of the notch, such as the notches of U.S. Pat. No. 5,432,876 (Appeldorn et al.), was also modeled. The notches of the comparative lightguide also had an angle of 120 degrees between first and second sidewalls of the notch, had a center depth of 0.168 mm, and had a width of 2 mm. The illumination intensities at a target plane, which was 330 mm underneath the solid lightguides, were determined. The illuminance distributions along the direction (x-direction) in the target plane orthogonal to the length of the lightguides are shown in FIG. 7 where the zero position refers to the point in the target plane directly under the center of the lightguides. The illuminances in FIG. 7 are normalized such that Comparative Example C-1 had an illuminance of unity directly under the center of the lightguide. The results show that the lightguide of Example 1 provided an improved width of the light output distribution.

Example 2 and Comparative Example C-2

Figure 8:
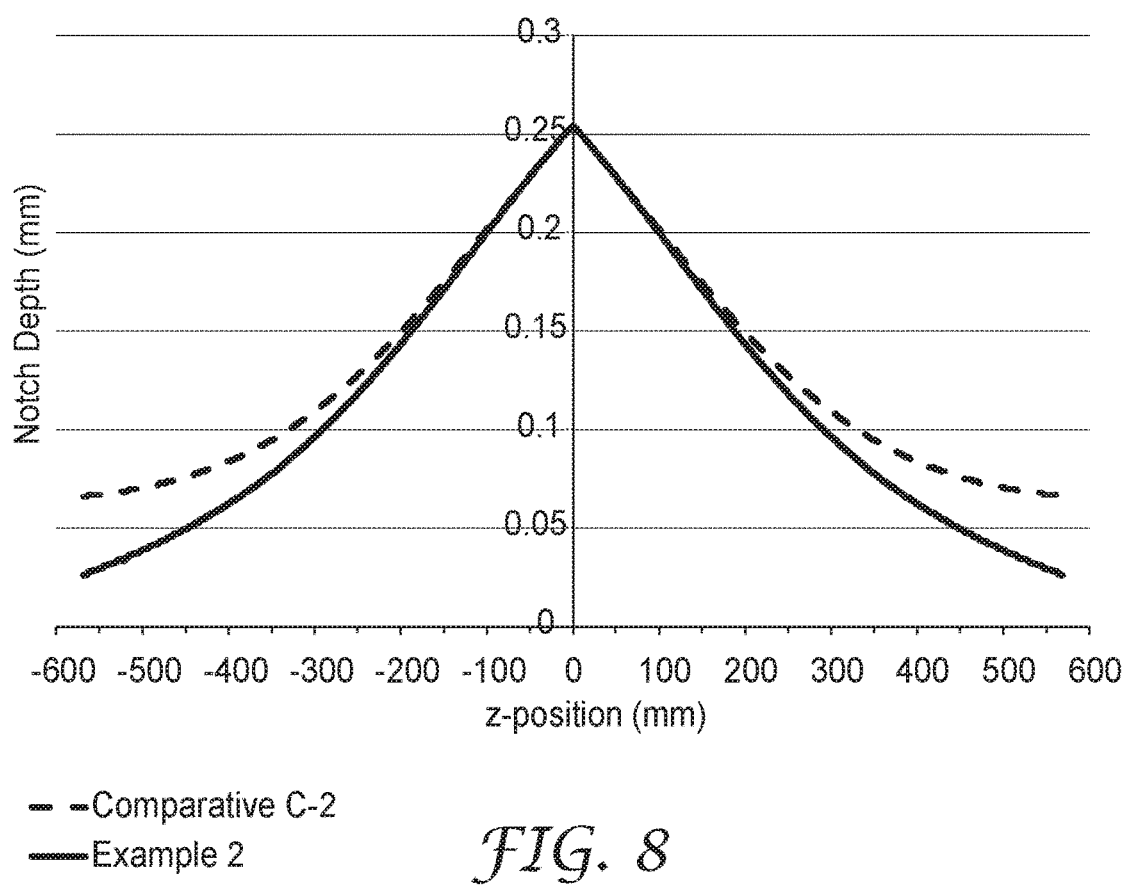
FIG. 8 is a graph of distributions of notch depth.

Optical modeling, similar to that used in Example 1, was used to evaluate the lightguide of FIG. 5 (Example 2). The modeled lightguide had light extracting structures having a width of 2.6 mm. The widths of the notches were constant along the length of the lightguide as in FIG. 1B. The lightguide had a curved bottom portion 513 having a diameter of 7 mm. The length of the light guide was 1200 mm. A comparative lightguide was also modeled (Comparative Example C-2). The comparative lightguide had a curved bottom portion similar to that in FIG. 5 and also included a curved upper portion, which did not include planar portions. The curved upper portion had notches with flat bottoms having a depth continuously decreasing towards zero from a center of the notch to an edge of the notch as in Comparative Example C-1. The notches of the comparative light guide had widths varying from 1.35 mm at the edges of the lightguide to 2.6 mm near the center of the lightguide. The notches of both Example 2 and Comparative Example C-2 had apex angles of 108 degrees. The maximum depths of the notches varied from about 0.25 mm at the centers of the lightguides to about 0.066 mm near the edges of the lightguide for Comparative Example C-2 and to about 0.026 mm near the edges of the lightguide for Example 2. The depth profiles along the length of the lightguides are shown in FIG. 8.

Figure 9:
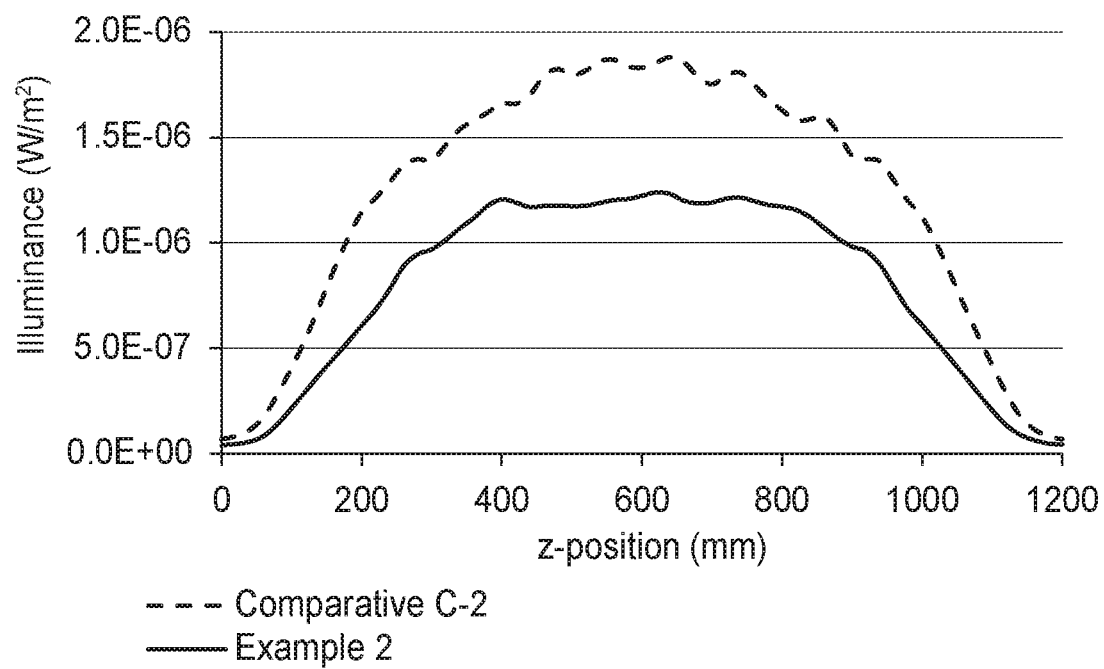
FIGS. 9-11 are graphs of illuminance distributions of light output from lightguides.
Figure 10:
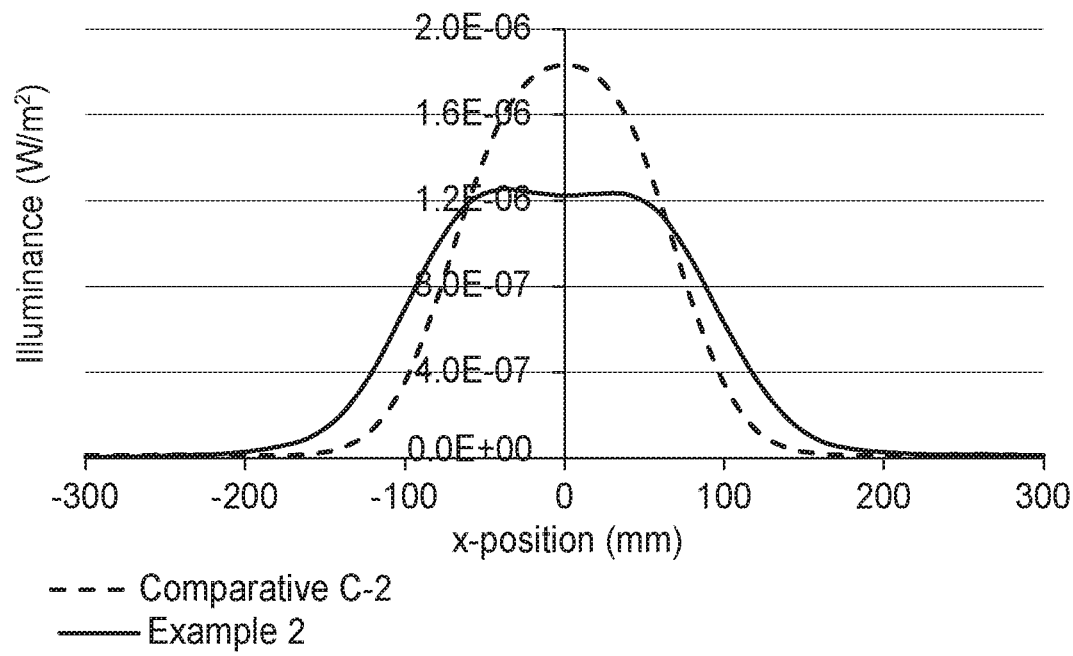
Figure 11:
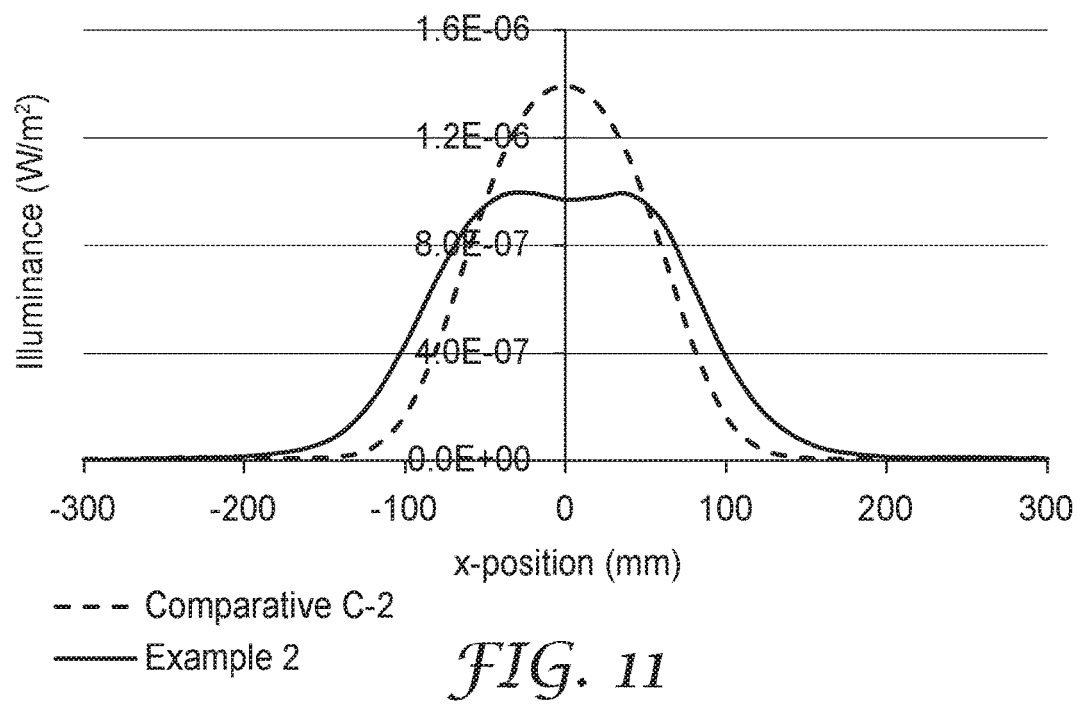

The illumination intensity at a target plane which was 240 mm underneath the solid lightguide were determined in a similar way as in Example 1. The illuminance distributions directly under the lightguides along the length of the lightguides (z-direction) are shown in FIG. 9. The illuminance distributions along the direction (x-direction) in the target plane orthogonal to the length of the lightguides are shown in FIG. 10 where the zero x-position refers to the point in the target plane directly under the center of the lightguides. FIG. 11 shows the illuminance distributions along the x-direction at a position along the length direction (z-direction) that was offset from the center point by 300 mm. The results show an improved light output distribution for Example 2 as compared to Comparative Example C-2.

The following is a list of exemplary embodiments of the present description.

Embodiment 1 is a lightguide centered on an optical axis and comprising a plurality of discrete spaced apart laser-ablated light extracting structures, each light extracting structure comprising:

opposing inclined first and second sidewalls extending from a first side of the lightguide toward the optical axis and meeting at an elongated peak extending along a first direction substantially perpendicular to the optical axis, the first and second sidewalls adapted to extract light propagating along the lightguide from an opposite second side of the lightguide by reflecting the propagating light toward the second side; and opposing generally triangular-shaped first and second endwalls extending between the first and second sidewalls from the first side of the lightguide to the elongated peak to form a notch extending into a core of the lightguide, wherein the notch has raised edges at least along the first and second endwalls.

Embodiment 2 is the lightguide of embodiment 1, wherein the elongated peak is substantially parallel to the first side of the lightguide.

Embodiment 3 is the lightguide of embodiment 1, wherein the first side of the lightguide comprises a substantially cylindrical surface and the elongated peak is substantially an arc substantially parallel to the substantially cylindrical surface.

Embodiment 4 is the lightguide of embodiment 1, wherein in a cross-section of the light extracting structure in a direction perpendicular to the optical axis, the elongated peak has a first curvature, and in a direction parallel to the optical axis, the elongated peak has a second curvature, wherein an absolute value of the second curvature is greater than an absolute value of the first curvature.

Embodiment 5 is the lightguide of embodiment 4, wherein the first and second curvatures are first and second principle curvatures having opposite signs.

Embodiment 6 is a lightguide centered on an optical axis and comprising a plurality of discrete spaced apart laser-ablated light extracting structures adapted to extract light propagating along the lightguide from an exit side of the lightguide by reflecting the propagating light toward the exit side, such that in plan view each light extracting structure has a plurality of sides comprising opposing longer sides extending along a first direction substantially perpendicular to the optical axis and opposing shorter sides substantially parallel to the optical axis, wherein the light extracting structures has raised edges along at least some of the plurality of sides.

Embodiment 7 is the lightguide of embodiment 6, wherein each light extracting structure comprises an elongated peak, such that in plan view the elongated peak extends substantially parallel to the opposing longer sides and bisects each shorter side into two substantially equal portions.

Embodiment 8 is the lightguide of embodiment 6, wherein in plan view each light extracting structure has a substantially obround shape having opposing longer straight sides extending along the first direction and opposing shorter curved sides substantially parallel to the optical axis.

Embodiment 9 is the lightguide of embodiment 6, wherein the opposing longer sides of each light extracting structure meet at an elongated peak, the elongated peak being curved in a cross-section of the light extracting structure perpendicular to the optical axis.

Embodiment 10 is the lightguide of embodiment 6, wherein the opposing longer sides of each light extracting structure meet at an elongated peak, the elongated peak having a negative Gaussian curvature along at least a portion of the elongated peak.

Embodiment 11 is a lightguide centered on an optical axis and comprising a plurality of discrete spaced apart laser-ablated light extracting structures, each light extracting structure defining a cavity extending from a first side of the lightguide into a core of the lightguide, the cavity elongated along a first direction substantially perpendicular to the optical axis, such that a maximum depth of the cavity does not decrease when moving along at least a portion of a length of the cavity along the first direction between a middle of the cavity and an edge of the cavity, and wherein each cavity defines a closed perimeter at the first side of the lightguide, the cavity having a raised edge along at least a portion of the closed perimeter.

Embodiment 12 is the lightguide of embodiment 11, such the between the middle and the edge of the cavity, the cavity has a greater maximum depth at a first location along the first direction closer to the edge of the cavity, and a smaller maximum depth at a second location along the first direction farther from the edge of the cavity.

Embodiment 13 is the lightguide of embodiment 11, wherein each cavity has a substantially constant maximum depth along at least 40% of the length of the cavity along the first direction.

Embodiment 14 is the lightguide of embodiment 11, wherein each cavity has a substantially constant maximum depth along at least 50% of the length of the cavity along the first direction.

Embodiment 15 is the lightguide of embodiment 11, wherein each cavity has a substantially constant maximum depth along at least 60% of the length of the cavity along the first direction.

Embodiment 16 is the lightguide of embodiment 11, wherein each cavity has a substantially constant maximum depth along at least 70% of the length of the cavity along the first direction.

Embodiment 17 is the lightguide of embodiment 11, wherein the raised edge of each cavity is along at least 50% of the closed perimeter of the cavity.

Embodiment 18 is the lightguide of embodiment 11, wherein in plan view, each cavity generally has a dog bone shape.

Embodiment 19 is the lightguide of embodiment 11, wherein the cavity of each light extracting structure comprises an elongated peak, the elongated peak being curved in a cross-section of the light extracting structure perpendicular to the optical axis.

Embodiment 20 is the lightguide of embodiment 11, wherein the cavity of each light extracting structure comprises an elongated peak, the elongated peak having a negative Gaussian curvature along at least a portion of the elongated peak.

Embodiment 21 is an elongated lightguide extended along a length of the lightguide and comprising a plurality of discrete spaced apart light extracting structures disposed on a planar top portion of the lightguide and extracting, from an opposite curved bottom portion of the lightguide, light that would otherwise be confined and propagate within the lightguide along the length of the lightguide primarily by total internal reflection, each light extracting structure defining a cavity extending from the planar top portion of the lightguide into a core of the lightguide.

Embodiment 22 is the elongated lightguide of embodiment 21 further comprising opposing curved side portions extending away and downwardly from opposite sides of the planar top portion toward the curved bottom portion.

Embodiment 23 is the elongated lightguide of embodiment 22, wherein the planar top portion forms a plateau raised relative to upper edges of the opposing curved side portions.

Embodiment 24 is the elongated lightguide of embodiment 21, wherein the cavity defined by each light extracting structure comprises a first side surface adapted to extract light propagating along the length of the lightguide from the curved bottom portion of the lightguide by reflecting the propagating light toward the bottom portion.

Embodiment 25 is the elongated lightguide of embodiment 21, wherein the planar top portion comprises a plurality of discrete spaced apart planar sections along the length of the lightguide, each light extracting structure formed in a corresponding planar section.

Embodiment 26 is the elongated lightguide of embodiment 21, wherein the light extracting structures are laser-ablated light extracting structures.

Embodiment 27 is a lightguide centered on an optical axis and comprising a plurality of discrete spaced apart light extracting structures, each light extracting structure comprising:

opposing inclined first and second sidewalls extending from a first side of the lightguide toward the optical axis and meeting at an elongated peak extending along a first direction substantially perpendicular to the optical axis, the first and second sidewalls adapted to extract light propagating along the lightguide from an opposite second side of the lightguide by reflecting the propagating light toward the second side; and opposing first and second endwalls extending between the first and second sidewalls from the first side of the lightguide to the elongated peak to form a notch extending into a core of the lightguide, wherein the first and second endwalls are generally half-hemispherically shaped and wherein, in plan view, each light extracting structure has a substantially obround shape having curved sides bounding the first and second endwalls and straight sides bounding the first and second sidewalls.

Embodiment 28 is the lightguide of embodiment 27, wherein the light extracting structures are disposed in a planar portion of the first side of the lightguide and the second side of the lightguide is curved.

Embodiment 29 is the lightguide of embodiment 28 further comprising opposing curved side portions extending away and downwardly from opposite sides of the planar top portion toward the second side.

Embodiment 30 is the lightguide of embodiment 29, wherein the planar top portion forms a plateau raised relative to upper edges of the opposing curved side portions.

Embodiment 31 is the lightguide of embodiment 27, wherein the notch has raised edges along at least a portion of a perimeter of the notch.

Embodiment 32 is the lightguide of embodiment 27, wherein the light extracting structures are laser-ablated light extracting structures.

Embodiment 33 is an elongated lightguide extended along a length of the lightguide and comprising a plurality of discrete spaced apart light extracting structures disposed on a planar top portion of the lightguide and extracting, from an opposite curved bottom portion of the lightguide, light that would otherwise be confined and propagate within the lightguide along the length of the lightguide primarily by total internal reflection, each light extracting structure defining a notch extending from the planar top portion of the lightguide into a core of the lightguide, the elongated lightguide further comprising opposing curved side portions extending away and downwardly from opposite sides of the planar top portion toward the curved bottom portion, wherein the planar top portion forms a plateau raised relative to upper edges of the opposing curved side portions.

Embodiment 34 is the elongated lightguide of embodiment 33, wherein the notch does not extend below the upper edges of the opposing curved side portions.

Embodiment 35 is the elongated lightguide of embodiment 33, wherein the curved bottom portion and the opposing curved side portions are substantially cylindrical surfaces.

Embodiment 36 is the elongated lightguide of embodiment 33, wherein the light extracting structures are laser-ablated light extracting structures.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A lightguide centered on an optical axis and comprising a plurality of discrete spaced apart laser-ablated light extracting structures, each light extracting structure comprising:

opposing inclined first and second sidewalls extending from a first side of the lightguide toward the optical axis and meeting at an elongated peak extending along a first direction substantially perpendicular to the optical axis, the first and second sidewalls adapted to extract light propagating along the lightguide from an opposite second side of the lightguide by reflecting the propagating light toward the second side; and opposing generally triangular-shaped first and second endwalls extending between the first and second sidewalls from the first side of the lightguide to the elongated peak to form a notch extending into a core of the lightguide, wherein the notch has raised edges at least along the first and second endwalls, a profile of the raised edges comprising a smooth continuous convex curve.

2. The lightguide of claim 1, wherein the elongated peak is substantially parallel to the first side of the lightguide.

3. The lightguide of claim 1, wherein the first side of the lightguide comprises a substantially cylindrical surface and the elongated peak is substantially an arc substantially parallel to the substantially cylindrical surface.

4. The lightguide of claim 1, wherein in a cross-section of the light extracting structure in a direction perpendicular to the optical axis, the elongated peak has a first curvature, and in a direction parallel to the optical axis, the elongated peak has a second curvature, wherein an absolute value of the second curvature is greater than an absolute value of the first curvature.

5. The lightguide of claim 4, wherein the first and second curvatures are first and second principle curvatures having opposite signs.

6. A lightguide centered on an optical axis and comprising a plurality of discrete spaced apart laser-ablated light extracting structures adapted to extract light propagating along the lightguide from an exit side of the lightguide by reflecting the propagating light toward the exit side, such that in plan view each light extracting structure has a plurality of sides comprising opposing longer sides extending along a first direction substantially perpendicular to the optical axis and opposing shorter sides substantially parallel to the optical axis, wherein the light extracting structures has raised edges along at least some of the plurality of sides, a profile of the raised edges comprising a smooth continuous convex curve.

7. The lightguide of claim 6, wherein each light extracting structure comprises an elongated peak, such that in plan view the elongated peak extends substantially parallel to the opposing longer sides and bisects each shorter side into two substantially equal portions.

8. The lightguide of claim 6, wherein in plan view each light extracting structure has a substantially obround shape having opposing longer straight sides extending along the first direction and opposing shorter curved sides substantially parallel to the optical axis.

9. The lightguide of claim 6, wherein the opposing longer sides of each light extracting structure meet at an elongated peak, the elongated peak being curved in a cross-section of the light extracting structure perpendicular to the optical axis.

10. The lightguide of claim 6, wherein the opposing longer sides of each light extracting structure meet at an elongated peak, the elongated peak having a negative Gaussian curvature along at least a portion of the elongated peak.

11. A lightguide centered on an optical axis and comprising a plurality of discrete spaced apart laser-ablated light extracting structures, each light extracting structure defining a cavity extending from a first side of the lightguide into a core of the lightguide, the cavity elongated along a first direction substantially perpendicular to the optical axis, such that a maximum depth of the cavity does not decrease when moving along at least a portion of a length of the cavity along the first direction between a middle of the cavity and an edge of the cavity, and wherein each cavity defines a closed perimeter at the first side of the lightguide, the cavity having a raised edge along at least a portion of the closed perimeter, a profile of the raised edge comprising a smooth continuous convex curve.

12. The lightguide of claim 11, wherein between the middle and the edge of the cavity, the cavity has a greater maximum depth at a first location along the first direction closer to the edge of the cavity, and a smaller maximum depth at a second location along the first direction farther from the edge of the cavity.

13. The lightguide of claim 11, wherein each cavity has a substantially constant maximum depth along at least 40% of the length of the cavity along the first direction.

14. The lightguide of claim 11, wherein each cavity has a substantially constant maximum depth along at least 50% of the length of the cavity along the first direction.

15. The lightguide of claim 11, wherein each cavity has a substantially constant maximum depth along at least 60% of the length of the cavity along the first direction.

16. The lightguide of claim 11, wherein each cavity has a substantially constant maximum depth along at least 70% of the length of the cavity along the first direction.

17. The lightguide of claim 11, wherein the raised edge of each cavity is along at least 50% of the closed perimeter of the cavity.

18. The lightguide of claim 11, wherein in plan view, each cavity generally has a dog bone shape.

19. The lightguide of claim 11, wherein the cavity of each light extracting structure comprises an elongated peak, the elongated peak being curved in a cross-section of the light extracting structure perpendicular to the optical axis.

20. The lightguide of claim 11, wherein the cavity of each light extracting structure comprises an elongated peak, the elongated peak having a negative Gaussian curvature along at least a portion of the elongated peak.

21. An elongated lightguide extended along a length of the lightguide and comprising a plurality of discrete spaced apart light extracting structures disposed on a planar top portion of the lightguide and opposing curved side portions extending away and downwardly from opposite sides of the planar top portion, the extracting structures extracting, from an opposite curved bottom portion of the lightguide, light that would otherwise be confined and propagate within the lightguide along the length of the lightguide primarily by total internal reflection, each light extracting structure defining a cavity extending from the planar top portion of the lightguide into a core of the lightguide, wherein the planar top portion forms a plateau raised relative to upper edges of the opposing curved side portions.

22. The elongated lightguide of claim 21, wherein the cavity defined by each light extracting structure comprises a first side surface adapted to extract light propagating along the length of the lightguide from the curved bottom portion of the lightguide by reflecting the propagating light toward the bottom portion.

23. The elongated lightguide of claim 21, wherein the planar top portion comprises a plurality of discrete spaced apart planar sections along the length of the lightguide, each light extracting structure formed in a corresponding planar section.

24. The elongated lightguide of claim 21, wherein the light extracting structures are laser-ablated light extracting structures.

25. A lightguide centered on an optical axis and comprising a plurality of discrete spaced apart light extracting structures disposed in a planar top portion of a first side of the lightguide and opposing curved side portions extending away and downwardly from opposite sides of the planar portion, each light extracting structure comprising:
    opposing inclined first and second sidewalls extending from the first side of the lightguide toward the optical axis and meeting at an elongated peak extending along a first direction substantially perpendicular to the optical axis, the first and second sidewalls adapted to extract light propagating along the lightguide from an opposite curved second side of the lightguide by reflecting the propagating light toward the second side; and
    opposing first and second endwalls extending between the first and second sidewalls from the first side of the lightguide to the elongated peak to form a notch extending into a core of the lightguide, wherein the first and second endwalls are generally half-hemispherically shaped and wherein, in plan view, each light extracting structure has a substantially obround shape having curved sides bounding the first and second endwalls and straight sides bounding the first and second sidewalls, wherein the planar top portion forms a plateau raised relative to upper edges of the opposing curved side portions.

26. The lightguide of claim 25, wherein the notch has raised edges along at least a portion of a perimeter of the notch.

27. The lightguide of claim 25, wherein the light extracting structures are laser-ablated light extracting structures.

28. An elongated lightguide extended along a length of the lightguide and comprising a plurality of discrete spaced apart light extracting structures disposed on a planar top portion of the lightguide and extracting, from an opposite curved bottom portion of the lightguide, light that would otherwise be confined and propagate within the lightguide along the length of the lightguide primarily by total internal reflection, each light extracting structure defining a notch extending from the planar top portion of the lightguide into a core of the lightguide, the elongated lightguide further comprising opposing curved side portions extending away and downwardly from opposite sides of the planar top portion toward the curved bottom portion, wherein the planar top portion forms a plateau raised relative to upper edges of the opposing curved side portions.

29. The elongated lightguide of claim 28, wherein the notch does not extend below the upper edges of the opposing curved side portions.

30. The elongated lightguide of claim 28, wherein the curved bottom portion and the opposing curved side portions are substantially cylindrical surfaces.

31. The elongated lightguide of claim 28, wherein the light extracting structures are laser-ablated light extracting structures.

* * * * *